(12) United States Patent
Tanaka et al.

(10) Patent No.: US 8,029,213 B2
(45) Date of Patent: Oct. 4, 2011

(54) INDEXABLE INSERT WITH NICK

(75) Inventors: Ai Tanaka, Itami (JP); Atsuhiko Maeta, Itami (JP)

(73) Assignee: Sumitomo Electric Industries, Ltd.

( * ) Notice: Subject to any disclaimer, the term of this patent is extended or adjusted under 35 U.S.C. 154(b) by 169 days.

(21) Appl. No.: 12/415,603

(22) Filed: Mar. 31, 2009

(65) Prior Publication Data

US 2009/0245950 A1 Oct. 1, 2009

(30) Foreign Application Priority Data

Mar. 31, 2008 (JP) ................................. 2008-091447

(51) Int. Cl.
B23B 27/00 (2006.01)
(52) U.S. Cl. ........................................ 407/114; 407/113
(58) Field of Classification Search .................. 407/113, 407/114, 115, 116
See application file for complete search history.

(56) References Cited

U.S. PATENT DOCUMENTS

| 4,335,984 | A | * | 6/1982 | Zweekly | 407/114 |
| 4,531,864 | A | * | 7/1985 | Bylund | 407/114 |
| 4,645,386 | A | * | 2/1987 | Smith | 407/113 |
| 4,681,486 | A | | 7/1987 | Hale | |
| 5,085,542 | A | * | 2/1992 | Nakayama et al. | 407/114 |
| 5,221,164 | A | * | 6/1993 | Allaire | 407/113 |
| 7,591,614 | B2 | * | 9/2009 | Craig | 407/66 |
| 2006/0269366 | A1 | | 11/2006 | Rieth | |

FOREIGN PATENT DOCUMENTS

| EP | 0 094 921 A1 | 11/1983 |
| EP | 1808248 A1 | 9/2005 |
| JP | 67856 Y2 | 3/1994 |
| JP | 2006305716 A | 11/2006 |

OTHER PUBLICATIONS

European Search Report for corresponding EP Application No. 09004045.2-1262, Jun. 10, 2009.
Chinese Office Action for corresponding CN Application No. 200910133305.9, dated Jul. 7, 2010, pp. 1-10 China.

* cited by examiner

*Primary Examiner* — Will Fridie, Jr.
(74) *Attorney, Agent, or Firm* — Ditthavong Mori & Steiner, P.C.

(57) ABSTRACT

An indexable insert with nicks for a rotary tool includes plurality of nicks are provided in an upper surface serving as a flank face. The nicks have their ends in the upper surface. The nicks divide a ridge line serving as a main cutting edge in a longitudinal direction. Each nick has a width gradually increasing toward the end.

6 Claims, 5 Drawing Sheets

INDEXABLE INSERT WITH NICK

BACKGROUND OF THE INVENTION

1. Field of the Invention

The present invention relates to an indexable insert with nicks to be used as a cutting edge for a rotary tool, such as a face milling cutter or an end mill.

2. Description of the Related Art

A known indexable insert includes an insert (an indexable insert with nicks) in which a plurality of nicks divides a ridge line of a cutting edge in a longitudinal direction and hence the ridge line is made rough. Such an insert with nicks is provided mainly as a cutting edge for a rotary tool. A face milling cutter employs an interrupted cutting edge as a main cutting edge (peripheral cutting edge). In use of such a rotary tool, the insert with nicks provided on the outer periphery of a tool body (cutter body) is arranged by shifting the phase of nicks of a former insert from the phase of nicks of a latter insert (so-called step arrangement) so that the latter insert complementarily cuts a remaining portion which has not been cut by the former insert in a comb like manner.

For example, inserts with nicks of related art are disclosed in, for example, Japanese Examined Utility Model Registration Application Publication No. 6-7856 and Japanese Unexamined Patent Application Publication No. 2006-305716. In a throw-away insert disclosed in Japanese Examined Utility Model Registration Application Publication No. 6-7856, a groove (in the specification, the groove is called nick) that divides a main cutting edge in a comb-like manner is provided on a flank face to extend in a direction obliquely intersecting with the main cutting edge. The groove (nick) has an end in the flank face, has a constant width from the position of the cutting edge to the end, and has a width gradually decreasing in a depth direction. The insert disclosed in Japanese Examined Utility Model Registration Application Publication No. 6-7856 is a so-called vertical insert having a side surface serving as a rake face, and upper and lower surfaces serving as flank faces.

In the throw-away insert disclosed in Japanese Unexamined Patent Application Publication No. 2006-305716, a nick that divides a main cutting edge is provided in a side surface. The insert disclosed in Japanese Unexamined Patent Application Publication No. 2006-305716 is used in a so-called horizontal position, in which upper and lower surfaces serve as rake faces, and a side surface serves as a flank face. That point is different from the insert disclosed in Japanese Examined Utility Model Registration Application Publication No. 6-7856. The nick extends from the edge at the upper surface to the edge at the lower surface (that is, the nick completely extends across the side surface of the insert in an insert thickness direction). This point is also different from Japanese Examined Utility Model Registration Application Publication No. 6-7856.

The throw-away insert disclosed in Japanese Examined Utility Model Registration Application Publication No. 6-7856 attempts to provide the following advantages. In particular, a cutting force is reduced by machining while the interrupted cutting edge divides chips. The cutting force is further reduced by inclining the nick with respect to the main cutting edge by an angle substantially equivalent to the angle of an axial rake of the cutting edge, by making the width of the nick constant, and by decreasing the width of the nick toward the bottom of the nick. Cutter vibration is reduced by reducing an impact during cutting. However, it is difficult to reliably provide a relief of the surface of the nick for the constant width of the nick. Therefore, depending on a cutting condition (for example, when a feed is increased), the surface of the nick contacts a workpiece, and hence a sufficient function is not provided. The machining condition may be narrow.

In the vertical insert with nicks in which the side surface having a greater area than that of the upper surface serves as a flank face, the nick depth direction is the insert thickness direction. The nick should not extend to the end of the flank face in the tool rotating direction so as to secure the strength of the insert. Hence, the insert is inclined in a direction in which the radial rake of the rake face approaches zero or in a direction in which a negative angle of the radial rake is increased in a view along a section perpendicular to the axis of the tool until the end of the nick does not interfere with the workpiece. The decrease in the radial rake of the rake face is limited. Owing to this, the substantial radial relief of the nick is limited within a small range. This also narrows the machining condition.

In the horizontal insert disclosed in Japanese Unexamined Patent Application Publication No. 2006-305716, the nick less affects the strength of the insert as compared with the vertical insert. Accordingly, the nick may extend from the upper surface to the lower surface. However, the nick receives a cutting force in the thickness direction. The insert is not suitable for heavy duty cutting.

SUMMARY OF THE INVENTION

It is an object of the invention to improve the vertical insert with nicks disclosed in Japanese Examined Utility Model Registration Application Publication No. 6-7856 to apply a proper relief to a surface of the nick, thereby reducing likelihood of contact of a workpiece to a flank face and widening a machining condition.

In light of this, according to an aspect of the invention, an indexable insert with nicks for a rotary tool is provided. The insert includes a side surface serving as a rake face; an upper surface serving as a flank face; a cutting edge provided by a ridge line at a position in which the side surface intersects with the upper surface; and a plurality of nicks that divide the cutting edge into a plurality of sections, each nick having an end in the upper surface, each nick having a width gradually increasing toward the end.

Preferably, a width W1 at an end part of each nick with respect to a width W at an entrance part of the nick adjacent to the ridge line is in a range of from 1.1W to 2.0W. In addition, preferably, each nick is provided by press forming. Further, preferably, each nick is tapered such that a width at an edge of the nick is greater than a width at a bottom of the nick.

The insert of the aspect, the width of the nick increases toward the end of the nick. Accordingly, when a cutting condition such as a feed is changed, a proper relief of the surface of the nick can be provided at the end of the nick. Thus, the reduction in cutting force can be attained by the function of the nick.

With respect to the width W of the nick at the entrance part, the lower limit of the width W1 at the end part may be preferably about 1.1W to attain the advantage of the aspect. The width of the nick at the end part is preferably as large as possible so as to secure the relief of the surface of the nick. The upper limit of the width W1 of the nick at the end part may be preferably 2.0W so as for the width of the cutting edge between nicks to have at least the same width to the width of the nick at the entrance part. Satisfying the condition, two inserts can mutually cover lacking parts (nick parts) of cutting edges of the inserts, and cutting without a remaining part can be provided.

The nick provided at the insert of the aspect may be provided by cutting. However, cutting of the nick with a varying width takes time, and hence, the nick is preferably provided by press forming, the molding condition of which is hardly limited.

The nick can be easily provided if the width of the nick at the edge is greater than the width of the nick the bottom. In addition, the edge of the nick has an obtuse angle, and this increases the strength of the nick.

DETAILED DESCRIPTION OF THE INVENTION

Figure 1:
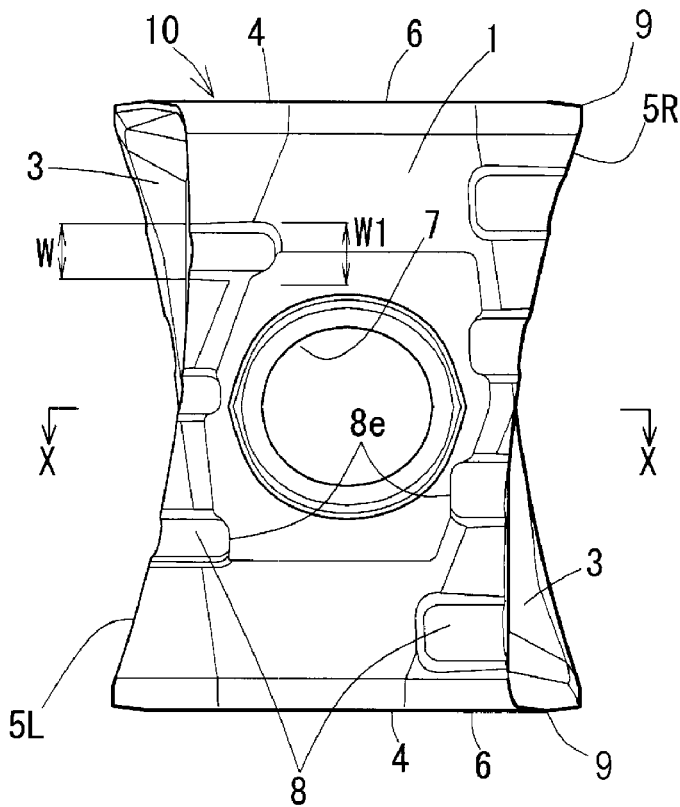
FIG. 1 illustrates an upper surface of an insert according to an embodiment of the invention.
Figure 2:
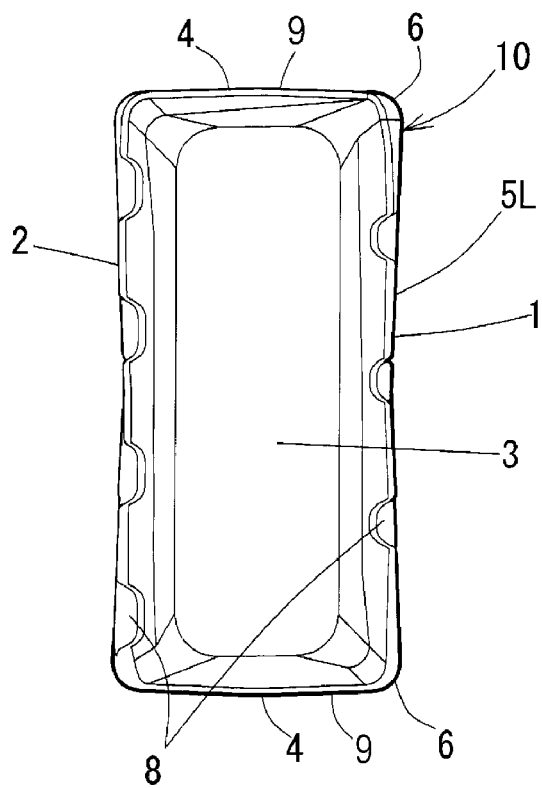
FIG. 2 is a side view showing the insert in FIG. 1.
Figure 3:
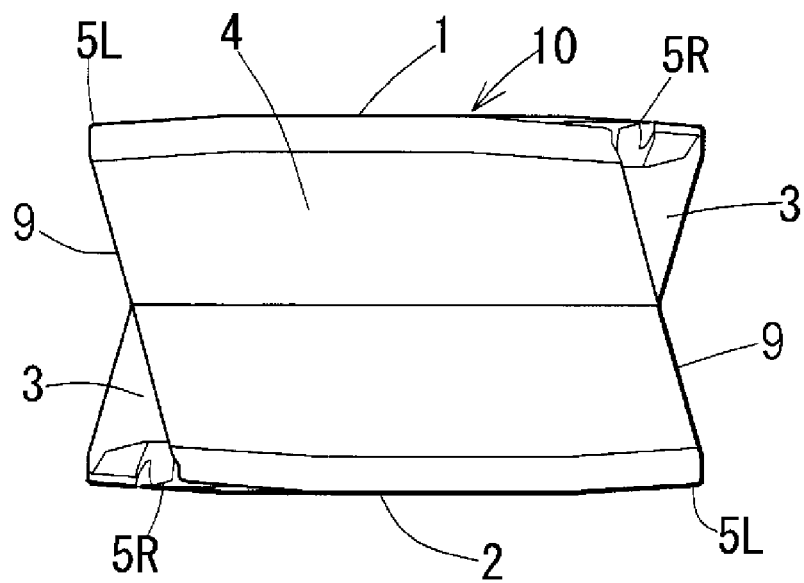
FIG. 3 is a bottom view showing the insert in FIG. 1.
Figure 4:
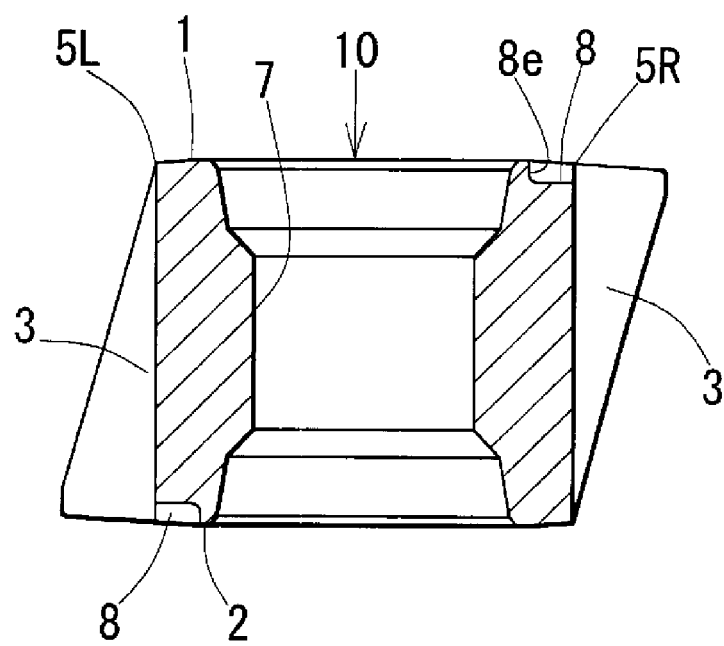
FIG. 4 is a cross-sectional view taken along line X-X in FIG. 1.

An indexable insert with nicks according to an embodiment of the present invention is described blow with reference to FIGS. 1 to 6. An indexable insert with nicks (hereinafter, merely referred to as insert) 10 is made such that a green compact is molded from raw powder such as a sintered hard alloy by press forming, and the green compact is sintered. Side surfaces 3 serving as rake faces are curved. Hence, ridge lines 5 at positions in which the side surfaces 3 intersect with an upper surface 1 are curved. Since the ridge lines 5 are used as cutting edges, axial rakes are provided during use. Reference numeral 2 denotes a lower surface. When the insert in FIG. 1 is inverted upside down, a surface having a similar shape to that of the upper surface before inversion appears at the front surface. That is, the lower surface has an identical structure to that of the upper surface 1. The lower surface 2 can be replaced with the upper surface 1. Since the lower surface 2 has the identical structure to that of the upper surface 1, the description of the lower surface 2 is omitted. Reference numeral 4 denotes end surfaces, 6 denotes ridge lines formed between the upper surface 1 and the end surfaces 4, and 7 in FIG. 4 denotes a mount hole penetrating through the centers of the upper and lower surfaces.

A plurality of nicks 8 are provided in the upper surface 1. The nicks 8 are provided along the two ridge lines 5 formed between the two side surfaces 3 and the upper surface 1 so as to divide the ridge lines 5 in a longitudinal direction. The nicks 8 are arranged at the ridge lines 5 at a predetermined interval in the longitudinal direction.

In the illustrated insert 10, referring to FIG. 1, the positions of the nicks 8 for dividing the left ridge line (for the convenience of description, indicated as 5L) are shifted from the positions of the nicks 8 for dividing the right ridge line (similarly, indicated as 5R) in the longitudinal direction. Accordingly, a step arrangement of cutting edges for complementary turning is provided without the phases of insert mount positions with respect to a tool body being changed in a tool-axis direction.

Figure 5:
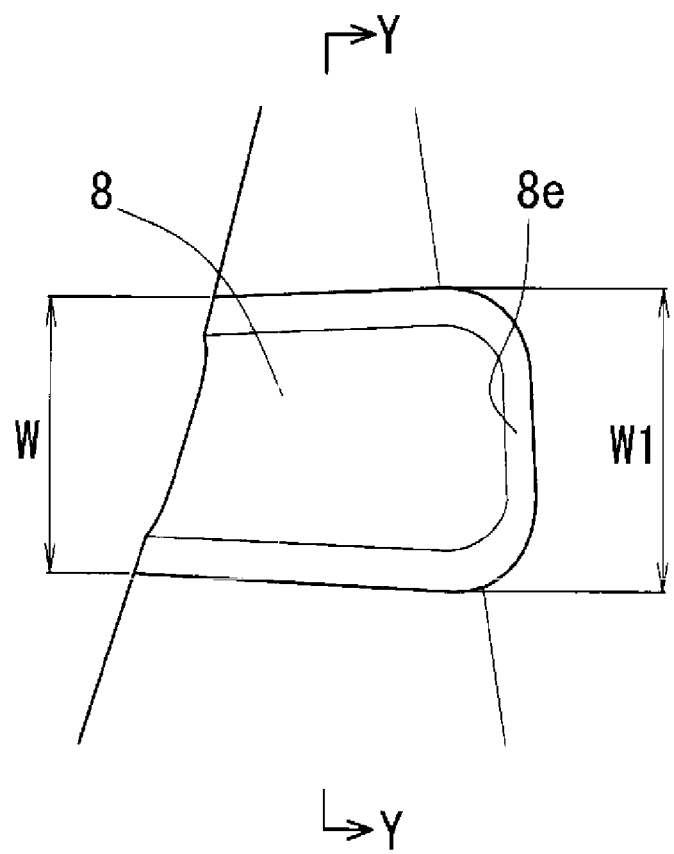
FIG. 5 is an enlarged view showing a nick in FIG. 1.

The nicks 8 extend substantially in parallel to the ridge lines 6. To keep the strength of the insert reduction, ends 8e of the nicks 8 are arranged at the upper surface 1 such that the nicks 8 do not extend from a side surface to another side surface (nicks do not reach the end of a flank face in a tool rotating direction during use). In addition, the length of the nicks 8 is as small as possible. Referring to FIG. 5, the width of each nick 8 is gradually increased from an entrance part of the nick 8 toward the end 8e such that the relationship between a width W at the entrance part and a width W1 at the end 8e becomes W1>W The width W1 at the end 8e is within a desired range, that is, in a range of from 1.1W to 2.0W.

Figure 6:
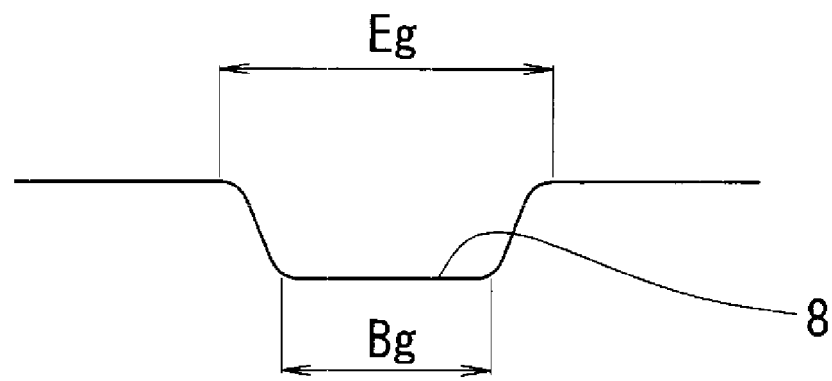
FIG. 6 is a cross-sectional view taken along line Y-Y in FIG. 5.

Further, the nicks 8 are provided by press forming. Referring to FIG. 6, the nick 8 is tapered in which a width Eg at an edge of the nick 8 is greater than a width Bg at a bottom of the nick 8.

Figure 7:
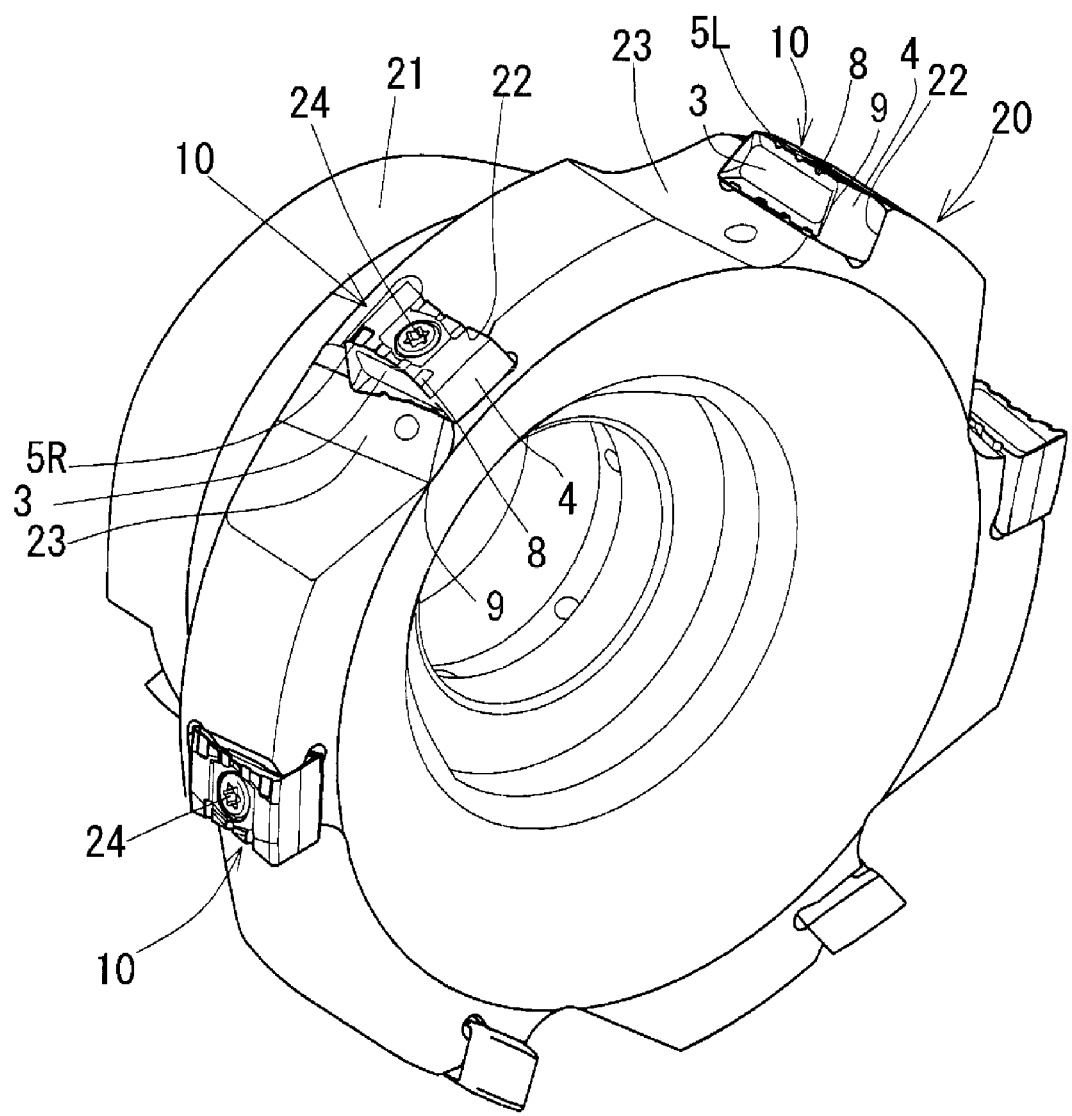
FIG. 7 is a perspective view showing an example of using the insert in FIG. 1.
Figure 8:
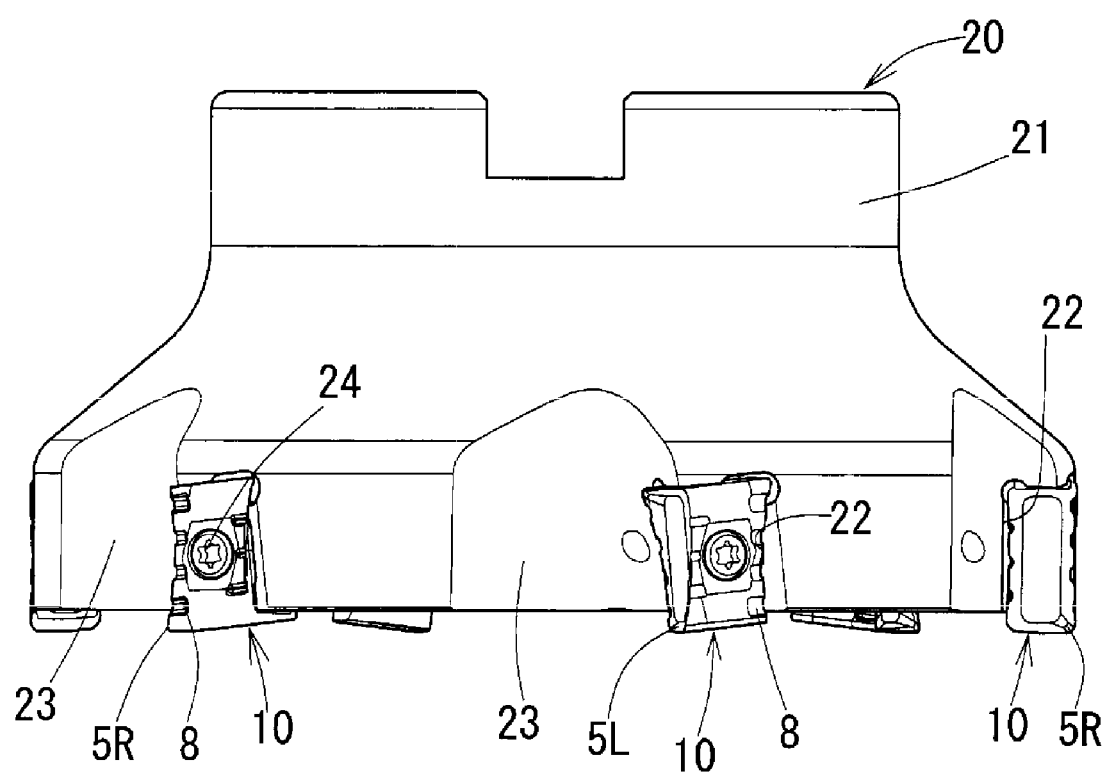
FIG. 8 is a side view showing a face milling cutter with nicks in FIG. 5.

FIGS. 7 and 8 illustrate a face milling cutter using exemplary inserts 10 as cutting edges. A face milling cutter 20 includes a plurality of insert bases 22 and a plurality of chip pockets 23 respectively adjacent to the insert bases 22 at a tip outer periphery of a tool body (cutter body) 21. In the face milling cutter 20, the inserts 10 which use the ridge lines 5L as cutting edges and the inserts 10 which use the ridge lines 5R as cutting edges are alternately mounted on the insert bases 22.

Each insert 10 has a side surface 3 serving as a rake face, an upper surface 1 serving as a radial flank face, and ridge lines 5L and 5R serving as main cutting edges. Ridge lines 9 formed between the side surfaces 3 and the end surfaces 4 serve as minor cutting edges. Each insert 10 is placed on the insert base 22 in a direction in which the end surface 4 serves as a front flank face (flank face of the minor cutting edge). Then, a clamp bolt 24 is inserted into the mount hole 7, thereby clamping each insert 10, and accordingly, each insert 10 is fixed to the tool body 21.

In the face milling cutter 20 with the above-described structure, one of the main cutting edge of the ridge line 5L and the main cutting edge of the ridge line 5R cuts a cut region of a workpiece first in a divided manner, and the other cuts a remaining cut region which is not cut by the former main cutting edge. At this time, the remaining cut region which is not cut by the former main cutting edge enters the nicks 8 of the former main cutting edge. As described above, since the width W1 at the end 8e is greater than the width W at the entrance part of the nick 8, the remaining cut region hardly contacts the surface of nick 8, and hence, the cutting force is not increased. Thus, a setting range such as a feed condition of a tool can be wide. The function of the interrupted cutting edge can be sufficiently provided under the wider cutting condition than the conventional cutting condition. Stable cutting with a low resistance can be performed.

The invention is effectively implemented even when the invention is applied to a rotary tool insert other than the face milling cutter, such as an end mill, a side milling cutter, or the like.

What is claimed is:

1. An indexable insert with nicks for a rotary tool, comprising:

a side surface service as a rake face;

an upper surface service as a flank face;

a lower surface having an identical structure to that of the upper surface;

a cutting edge provided by a ridge line at a position in which the said surface intersects with the upper surface; and a plurality of nicks that divide the cutting edge into a plurality of sections, each nick having an end in the upper surface, each nick having a width gradually increasing from the cutting edge to the end, wherein the positions of the nicks for dividing the left ridge line are shifted from the positions of the nicks for diving the right ridge line in the longitudinal direction, wherein a width W1 at an end part of each nick with respect to a width W at an entrance part of the nick adjacent to the ridge line is in a range of from 1.1 W to 2.0 W.

2. The indexable insert with nicks according to claim 1, wherein each nick is provided by press forming.

3. The indexable insert with nicks according to claim 1, wherein each nick is provided by press forming.

4. The indexable insert with nicks according to claim 1, wherein each nick is tapered such that a width at an edge of the nick is greater than a width at a bottom of the nick.

5. The indexable insert with nicks according to claim 1, wherein each nick is tapered such that a width at an edge of the nick is greater than a width at a bottom of the nick.

6. The indexable insert with nicks according to claim 2, wherein each nick is tapered such that a width at an edge of the nick is greater than a width at a bottom of the nick.

* * * * *

UNITED STATES PATENT AND TRADEMARK OFFICE
CERTIFICATE OF CORRECTION

| | |
|---|---|
| PATENT NO. | : 8,029,213 B2 |
| APPLICATION NO. | : 12/415603 |
| DATED | : October 4, 2011 |
| INVENTOR(S) | : Ai Tanaka and Atsuhiko Maeta |

It is certified that error appears in the above-identified patent and that said Letters Patent is hereby corrected as shown below:

Title Page, item (73) Assignee information should read:
Sumitomo Electric Hardmetal Corp., Itami-shi (JP)

Signed and Sealed this
Twenty-ninth Day of November, 2011

David J. Kappos
*Director of the United States Patent and Trademark Office*